United States Patent
Zhi et al.

(10) Patent No.: US 12,524,723 B2
(45) Date of Patent: Jan. 13, 2026

(54) SYSTEMS AND METHODS FOR RISK DIAGNOSIS OF CRYPTOCURRENCY ADDRESSES ON BLOCKCHAINS USING ANONYMOUS AND PUBLIC INFORMATION

(71) Applicant: JPMORGAN CHASE BANK, N.A., New York, NY (US)

(72) Inventors: Xiaoying Zhi, Zurich (CH); Yash Satsangi, Tilburg (NL); Shaltiel Eloul, London (GB); Sean Moran, London (GB); Alex Stoliar, Giv'atayim (IL); Helene Khaykovich, Tel Aviv (IL); Shravan Kumar Parunandula, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 302 days.

(21) Appl. No.: 18/333,927

(22) Filed: Jun. 13, 2023

(65) Prior Publication Data
US 2023/0401510 A1     Dec. 14, 2023

(30) Foreign Application Priority Data
Jun. 14, 2022   (IN) .............................. 202211034138

(51) Int. Cl.
*G06Q 10/0635*    (2023.01)
(52) U.S. Cl.
CPC ..... *G06Q 10/0635* (2013.01); *G06Q 2220/00* (2013.01)

(58) Field of Classification Search
None
See application file for complete search history.

(56) References Cited

U.S. PATENT DOCUMENTS

| | | | |
|---|---|---|---|
| 12,026,789 B2* | 7/2024 | Jevans ................... | G06Q 20/36 |
| 2018/0204111 A1* | 7/2018 | Zadeh ................... | G06V 10/764 |
| 2018/0264347 A1* | 9/2018 | Tran ........................ | G06V 40/28 |
| 2019/0236698 A1* | 8/2019 | Postrel ................... | G06Q 40/04 |
| 2021/0383395 A1* | 12/2021 | Galka .................... | G06Q 20/065 |
| 2022/0188719 A1* | 6/2022 | Ramaswamy ........ | G06F 21/552 |
| 2023/0109545 A1* | 4/2023 | Wilkerson ............... | G06N 3/08 |
| | | | 713/175 |
| 2023/0237467 A1* | 7/2023 | Yu ............................ | H04L 9/50 |
| | | | 705/4 |

(Continued)

*Primary Examiner* — Folashade Anderson
(74) *Attorney, Agent, or Firm* — GREENBERG TRAURIG LLP (57) ABSTRACT

Systems and methods for risk diagnosis of cryptocurrency addresses on blockchains using anonymous and public information are disclosed. In one embodiment, a method may include a risk diagnosis computer program executed by a server: receiving data with labels and data without labels from public data databases and/or anonymous data databases; fitting the data without labels into a plurality of clusters using unsupervised learning; assigning a risk level to each of the plurality of clusters; verifying the risk level for each of the plurality of clusters using the data with labels; receiving unseen data; and predicting a risk level associated with the unseen data by constructing features and text embeddings from the unseen data, clustering the unseen data based on a distance measurement to one of the plurality of clusters, and returning a risk level associated with the cluster.

17 Claims, 6 Drawing Sheets

(56) References Cited

U.S. PATENT DOCUMENTS

| | | | |
|---|---|---|---|
| 2023/0385839 A1* | 11/2023 | Nadi | G06Q 20/4016 |
| 2024/0037161 A1* | 2/2024 | Peled | G06Q 30/0271 |
| 2024/0362326 A1* | 10/2024 | Slawinski | G06F 21/562 |
| 2025/0245666 A1* | 7/2025 | Mahzoon | G06Q 20/382 |

* cited by examiner

Report Clustering on illicit addresses

| risk | cluster | illicit count | licit count | illicit ratio among risk | licit ratio among risk | illicit ratio among illicit | licit ratio among licit |
|---|---|---|---|---|---|---|---|
| LOW | 0 | 0 | 6 | 0% | 100% | 0% | 25% |
| HIGH | 1 | 3 | 0 | 100% | 0% | 6% | 0% |
| HIGH | 2 | 12 | 1 | 92% | 8% | 24% | 4% |
| MED | 3 | 4 | 3 | 57% | 43% | 8% | 12.5% |
| LOW | 4 | 3 | 6 | 33% | 67% | 6% | 25% |
| HIGH | 5 | 19 | 1 | 95% | 5% | 37% | 4% |
| MED | 6 | 7 | 3 | 70% | 30% | 14% | 12.5% |
| LOW | 7 | 3 | 4 | 43% | 57% | 6% | 17% |

FIGURE 4

Cluster Verification From Labeled Data -- Graph

Graph Clustering on Illicit+Licit addresses

| risk | cluster | illicit count | licit count | illicit ratio | licit ratio |
|---|---|---|---|---|---|
| HIGH | 0 | 70 | 1 | 99% | 1% |
| MED | 1 | 37 | 51 | 42% | 58% |
| HIGH | 2 | 42 | 1 | 98% | 2% |
| MED | 3 | 11 | 18 | 38% | 62% |
| LOW | 4 | 37 | 85 | 30% | 70% |

Graph Clustering on Illicit addresses

| | | | |
|---|---|---|---|
| HIGH | cluster 0: | 0 | 0.0 |
| MED | cluster 1: | 0 | 0.0 |
| HIGH | cluster 2: | 38 | 0.7450980392156863 |
| MED | cluster 3: | 4 | 0.07843137254900196 |
| LOW | cluster 4: | 9 | 0.17647058823529413 |

Graph Clustering on Licit addresses cluster 0: 0
cluster 1: 0
cluster 2: 0
cluster 3: 1
cluster 4: 21

SYSTEMS AND METHODS FOR RISK DIAGNOSIS OF CRYPTOCURRENCY ADDRESSES ON BLOCKCHAINS USING ANONYMOUS AND PUBLIC INFORMATION

RELATED APPLICATIONS

This application claims priority to, and the benefit of, Indian Patent Application No. 202211034138, filed Jun. 14, 2022, the disclosure of which is hereby incorporated, by reference, in its entirety.

BACKGROUND OF THE INVENTION

1. Field of the Invention

Embodiments relate to systems and methods for risk diagnosis of cryptocurrency addresses on blockchains using anonymous and available information of publicly reported addresses.

2. Description of the Related Art

Cryptocurrency and digital currency transactions have been increasing over the past decade. Due to the anonymous nature of some ledgers, cryptocurrency can also be a central route for non-legitimate activities, such as blackmails, money laundering, darknet trades, fraud, and terror funding. This poses a great challenge to public digital currency ledgers being fully trusted.

In recent years, efforts have been devoted to build artificial intelligence-based mechanisms to classify organized activities and detect illicit transactions. For example, machine learning algorithms based on Random Forest, XGBoost, and neural network models (e.g., Graph Convolutional Network ("GCN") models) may use transactions as nodes, connections, and features on a blockchain network, embedded and propagated through the models to be mapped to a classification. A comprehensive study in M. Weber, et al., "Anti-Money Laundering In Bitcoin: Experimenting With Graph Convolutional Networks For Financial Forensics," arXiv:1908.02591 (2019), the disclosure of which is hereby incorporated, by reference, in its entirety, reported an illicit transaction detection rate of between 72% and 75% for various variations on neural-network (NN) architecture using GCN layers.

Previous models rely on historical labeled data, however, blockchain cryptocurrency has been identified to have dynamic graphs and requires real time and labels to be able to create a useful illicit detection system.

Public address reports and address voting service such as 'bitcoinabuse.com' has a potential to provide resources for labels in real-time. They cannot, however, be directly used as labels due to reliability issues (e.g., mistakes, spam, advertisements, etc.).

SUMMARY OF THE INVENTION

Embodiments provide fully or substantially automated systems and methods that may identify the reliability of labels, and in combination with transaction graphs and raw information on addresses, diagnose risks of transacting with unknown addresses.

Systems and methods for risk diagnosis of cryptocurrency addresses on blockchains using anonymous and public information are disclosed. In one embodiment, a method for risk diagnosis of cryptocurrency addresses on blockchains using anonymous and public information may include: (1) receiving, by a risk diagnosis computer program executed by a server, data with labels and data without labels from public data databases (e.g., voting/public reports such as bitcoinabuse.com, and/or anonymous data databases such as graph transactions of blockchain); (2) fitting, by the risk diagnosis computer program, the data without labels into a plurality of clusters using unsupervised learning; (3) assigning, by the risk diagnosis computer program, a risk level to each of the plurality of clusters; (4) verifying, by the risk diagnosis computer program, the risk level for each of the plurality of clusters using the data with labels; (5) receiving, by the risk diagnosis computer program, unseen data; and (6) predicting, by the risk diagnosis computer program, a risk level associated with the unseen data by constructing feature vectors and text embeddings from the unseen data, clustering the unseen data based on a distance measurement to one of the plurality of clusters, and returning a risk level associated with the cluster.

According to another embodiment, a method for risk diagnosis of cryptocurrency addresses on blockchains may include: (1) receiving, by a risk diagnosis computer program executed by a server, data with labels and data without labels from public data databases and/or anonymous data databases; (2) fitting, by the risk diagnosis computer program, the data without labels and the data with labels into a plurality of clusters using unsupervised learning; (3) assigning, by the risk diagnosis computer program, a risk level to each of the plurality of clusters based on the data with labels in the cluster; (4) receiving, by the risk diagnosis computer program, unseen data; and (5) predicting, by the risk diagnosis computer program, a risk level associated with the unseen data by constructing features from the unseen data, clustering the unseen data to one of the plurality of clusters, and returning the risk level associated with the cluster to which the unseen data is clustered.

In one embodiment, the data may include transaction graphs and public reports for blockchain addresses.

In one embodiment, the risk diagnosis computer program may construct feature vectors from features and/or text embeddings from the data without labels.

In one embodiment, the risk diagnosis computer program may cluster the data without labels using an unsupervised learning/embedding algorithm.

In one embodiment, the unsupervised learning/embedding algorithm may include K-means clustering or a graph neural network.

In one embodiment, the unseen data may include a cryptocurrency address associated with a potential counter-party.

In one embodiment, the method may also include notifying, by the risk diagnosis computer program, a user application that the unseen data is associated with a high risk.

In one embodiment, the method may also include preventing, by the risk diagnosis computer program, a transaction involving the unseen data from occurring in response to the unseen data being associated with a high risk.

In one embodiment, the data may include blockchain address data.

According to another embodiment, a system may include: one or more databases storing data with labels and data without labels; a server executing a risk diagnosis computer program; and a user device executing a user application. The risk diagnosis computer program receives the data with labels and the data without labels, fits the data without labels and the data with labels into a plurality of clusters using unsupervised learning, assigns a risk level to each of the plurality of clusters based on the data with labels in the cluster, receives unseen data from the user application, and predicts a risk level associated with the unseen data by constructing features from the unseen data, clustering the unseen data to one of the plurality of clusters, and returning the risk level associated with the cluster to which the unseen data is clustered.

In one embodiment, the data may include transaction graphs and public reports for blockchain addresses.

In one embodiment, the risk diagnosis computer program may construct feature vectors from features and/or text embeddings from the data without labels.

In one embodiment, the risk diagnosis computer program may cluster the data without labels using an unsupervised learning/embedding algorithm.

In one embodiment, the unsupervised learning/embedding algorithm may include K-means clustering or a graph neural network.

In one embodiment, the unseen data may include a cryptocurrency address associated with a potential counterparty.

In one embodiment, the risk diagnosis computer program may notify the user application that the unseen data is associated with a high risk.

In one embodiment, the risk diagnosis computer program may prevent a transaction involving the unseen data from occurring in response to the unseen data being associated with a high risk.

In one embodiment, the data without labels may include data with masked or hidden labels.

According to another embodiment, a non-transitory computer readable storage medium, may include instructions stored thereon, which when read and executed by one or more computer processors, cause the one or more computer processors to perform steps comprising: receiving data with labels and data without labels from public data databases and/or anonymous data databases, wherein the data comprises transaction graphs and public reports for blockchain addresses; fitting the data without labels and the data with labels into a plurality of clusters using an unsupervised learning/embedding algorithm, wherein the unsupervised learning/embedding algorithm comprises K-means clustering or a graph neural network; assigning a risk level to each of the plurality of clusters based on the data with labels in the cluster; receiving unseen data, wherein the unseen data comprises a cryptocurrency address associated with a potential counterparty; and predicting a risk level associated with the unseen data by constructing features from the unseen data, clustering the unseen data to one of the plurality of clusters, and returning the risk level associated with the cluster to which the unseen data is clustered.

In one embodiment, the non-transitory computer readable storage medium may also include instructions stored thereon, which when read and executed by one or more computer processors, cause the one or more computer processors to prevent a transaction involving the unseen data from occurring in response to the unseen data being associated with a high risk.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are directed to systems and methods for risk diagnosis of cryptocurrency addresses on blockchains using anonymous and public information.

The disclosure of U.S. Provisional Patent Application Ser. No. 63/209,323, filed Jun. 10, 2021 and of U.S. patent application Ser. No. 17/657,051, filed Mar. 29, 2022 are hereby incorporated, by reference, in their entireties.

Embodiments may use machine learning algorithms that may be trained based on, for example, public textual reports, behavioral information (e.g. time of report, location, number of reports, unique reports), and graph transaction data (e.g., edges as connection between addresses as transactions, balance, value of transaction, no. of connections, number of labeled neighbors, different rank of neighbors) for any address given in the database.

Embodiments may provide real-time data retrieval and analysis, with minimal or no human effort or intelligence needed.

Due to the nature of the databases used, embodiments may have low or no data-related costs.

Embodiments may use a multimodal methodology that allows cross-info among different data types. Information from graph transactions, text from reports, and raw features may provide evidence that facilitate the decision/classification/clustering of the other.

Embodiments may also predict illicit activity topics (e.g., ransomware, terror, sanctions, etc.) for addresses that are not contained in the contain textual report but are only in the graph transaction information. This may be done by comparing similarity to graph structures that did have text reports information in the report database (e.g., casting from report clusters to graph embeddings).

In embodiments, the machine learning models and/or clusters may be recalibrated based on newly collected data (labels or newly developed patterns).

Figure 1:
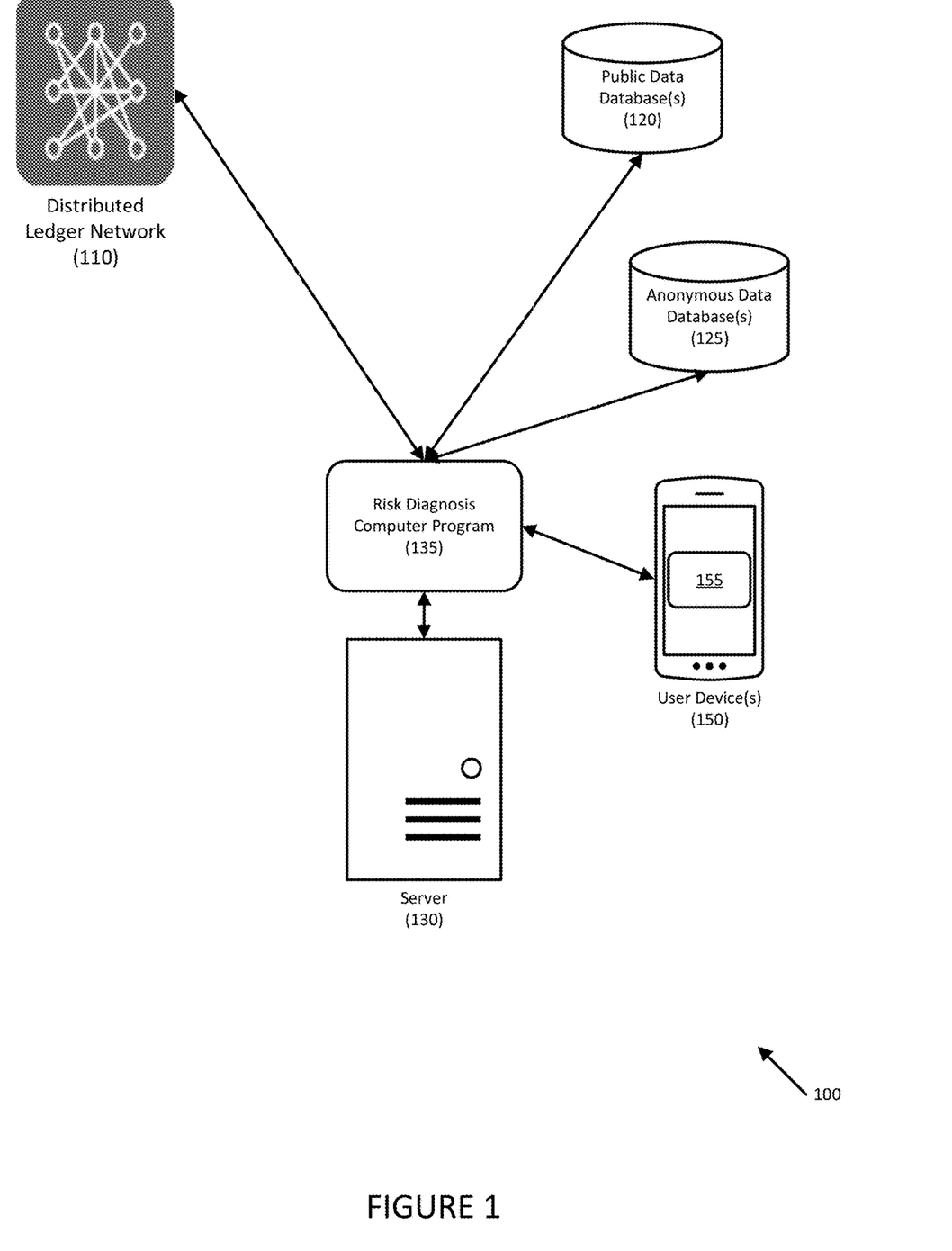
FIG. 1 illustrates a system for risk diagnosis of cryptocurrency addresses on blockchains using anonymous and public information according to one embodiment.

Referring to FIG. 1, a system for risk diagnosis of cryptocurrency addresses on blockchains using anonymous and public information is disclosed according to one embodiment. System 100 may include distributed ledger network 110, which may be any suitable distributed ledger network. In one embodiment, distributed ledger network 110 may support a cryptocurrency that provides anonymity, such as Bitcoin.

Server 130 may execute risk diagnosis computer program 135. Server 130 may be any suitable server, including physical servers, cloud-based servers, combinations, etc. Risk diagnosis computer program 135 may receive data from public data database(s) 120 and anonymous databases 125, including data without labels and data with labels. For example, the data received may include transaction graphs, public reports (e.g., abuse databases such as Bitcoinabuse for Bitcoin, government sanction lists databases, etc.), etc. The public databases are generally anonymous in that unless the owner of an address discloses the ownership, there is no way to know the true identity of the owner.

Risk diagnosis computer program 135 may use unsupervised learning to construct features and text embeddings from the data, and perform clustering based on those features using an unsupervised learning/embedding algorithm (e.g., K-means clustering, Graph Neural Networks (GNN) for graphs, etc.). Risk diagnosis computer program 135 may then assign risk levels to each cluster and verify the assigned risk levels using the data with labels.

Risk diagnosis computer program 135 may then predict, for unseen data such as a cryptocurrency address for a potential counterparty to a transaction, a risk level for transacting with the potential counterparty by constructing features and text embeddings from the unseen data, and clustering the unseen data based on a distance measurement to the clusters.

Users may access risk diagnosis computer program 135 using user applications 155 executed by user devices 150. For example, users may query risk diagnosis computer program 135 to predict a risk associated with a cryptocurrency address of a counter party, or risk diagnosis computer program 135 may be associated with a transaction process, such as a "checkout" process.

User applications 155 may be computer program, distributed applications, browsers, etc. For example, user applications 155 may be applications that facilitate cryptocurrency transactions on distributed ledger network 110.

Figure 2:
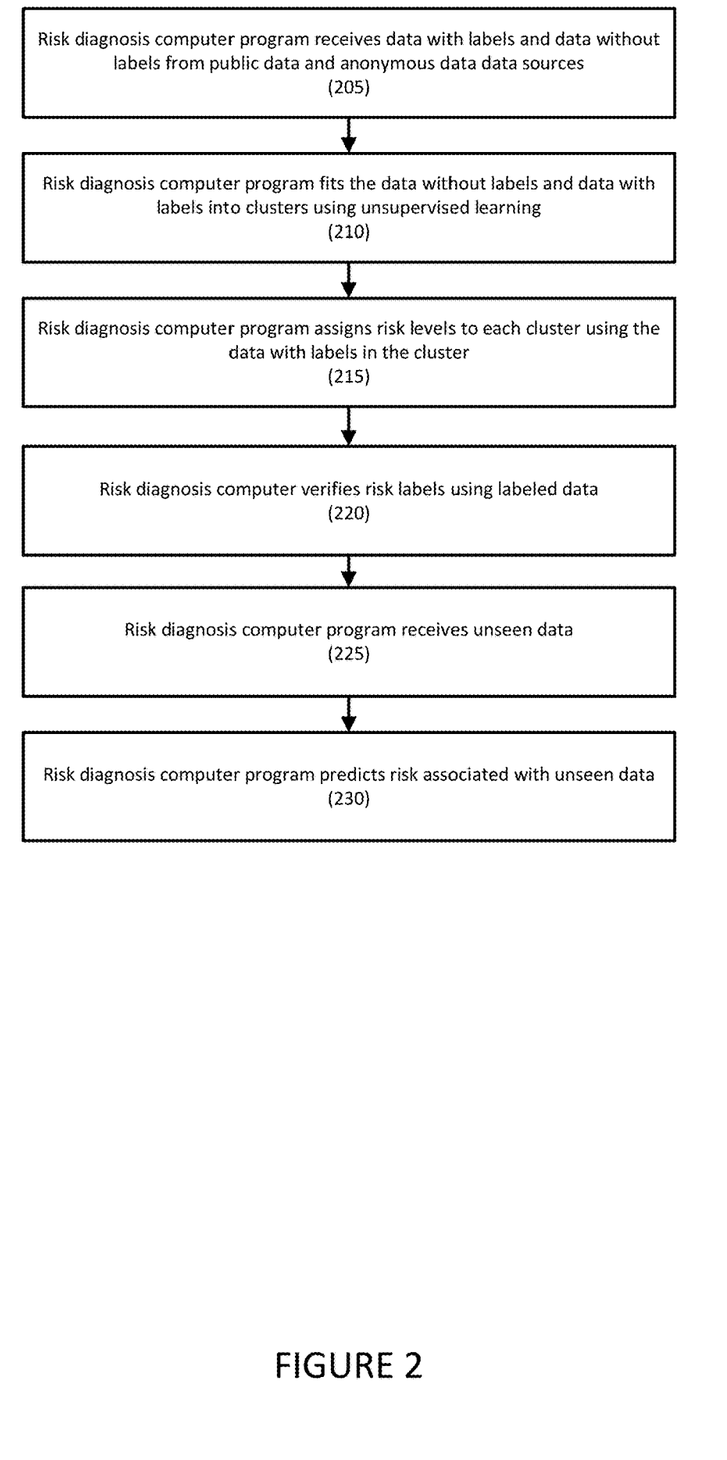
FIG. 2 depicts a method for risk diagnosis of cryptocurrency addresses on blockchains using anonymous and public information according to one embodiment.

Referring to FIG. 2, a method for risk diagnosis of cryptocurrency addresses on blockchains using anonymous and public information is disclosed according to one embodiment.

In step 205, a risk diagnosis computer program executed by a server may receive data with labels and data without labels from one or more data sources (e.g., public data databases, anonymous data databases, etc.). Examples of data include transaction graphs and public reports (e.g., abuse reports, etc.), etc.

In step 210, the risk diagnosis computer program may fit the data without labels, or data with hidden or masked labels, and the data with labels into clusters using unsupervised learning. Specifically, the risk diagnosis computer program may construct features and text embeddings from the data, and perform clustering based on those features (e.g., K-means clustering, GNNs, etc.).

Figure 3:
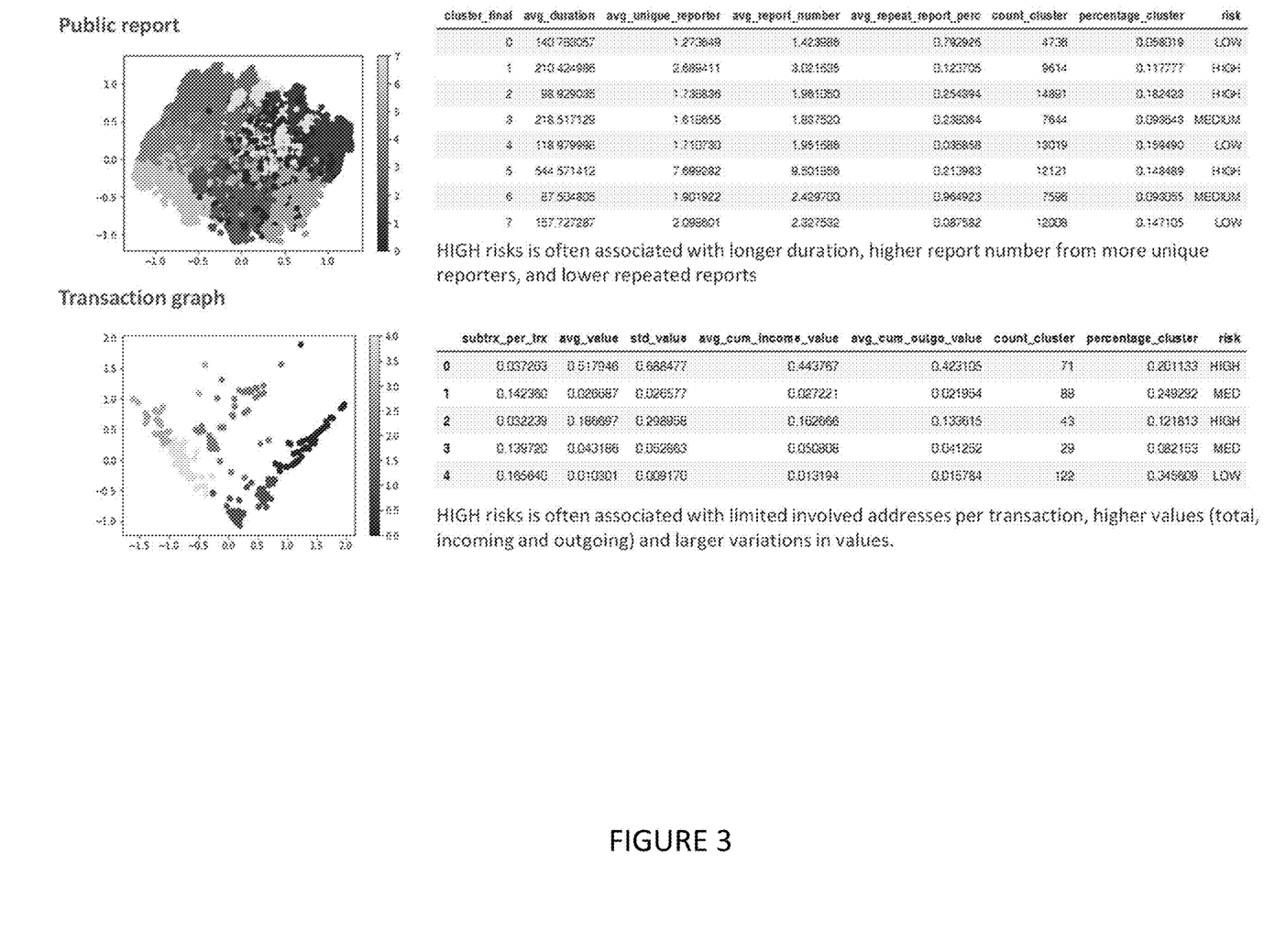
FIG. 3 depicts examples of clustering from public reports and transaction graphs according to an embodiment. From the public chart, it can be gleaned that a high risk is often associated with longer duration, higher report number from more unique reporters, and lower repeated reports. From the transaction graph, it can be gleaned that a high risk is often associated with limited involved addresses per transaction, higher values (total, incoming and outgoing) and larger variations in values.

FIG. 3 depicts examples of clustering from public reports and transaction graphs.

In step 215, the risk diagnosis computer program may assign risk levels to each cluster based on the data with labels in the cluster. For example, the risk diagnosis computer program may determine the number of illicit data points in each cluster and may assess the risk level in the cluster based on the percentage of labeled illicit data points out of all labeled data points in each cluster. Any other suitable mechanism for assigning a risk level to each cluster may be used as is necessary and/or desired.

In step 220, the risk diagnosis computer program may validate the risk labels using, for example, data with labels that were not used in the clustering process. For example, the risk diagnosis computer program may predict a risk level for the data with labels, and may confirm that the predicted risk level matches the labeled risk level. If the risk levels do not match, additional data with labels may be used to update the clusters.

Referring again to FIG. 2, in step 225, the risk diagnosis computer program may receive, from a user device, unseen data, such as a cryptocurrency address for a potential counterparty to a transaction, and in step 230, may predict a risk level for transacting with the potential counterparty. In one embodiment, similar to what is described above, the risk diagnosis computer program may construct features from the unseen data, and cluster the unseen data based on the features using, for example, K-Means, graph neural networks (GNNs), etc. The risk diagnosis computer program may then return the risk level associated with the cluster in which the unseen data fits.

If the unseen data does not into a cluster, the risk level for the closest cluster may be selected.

Figure 4:
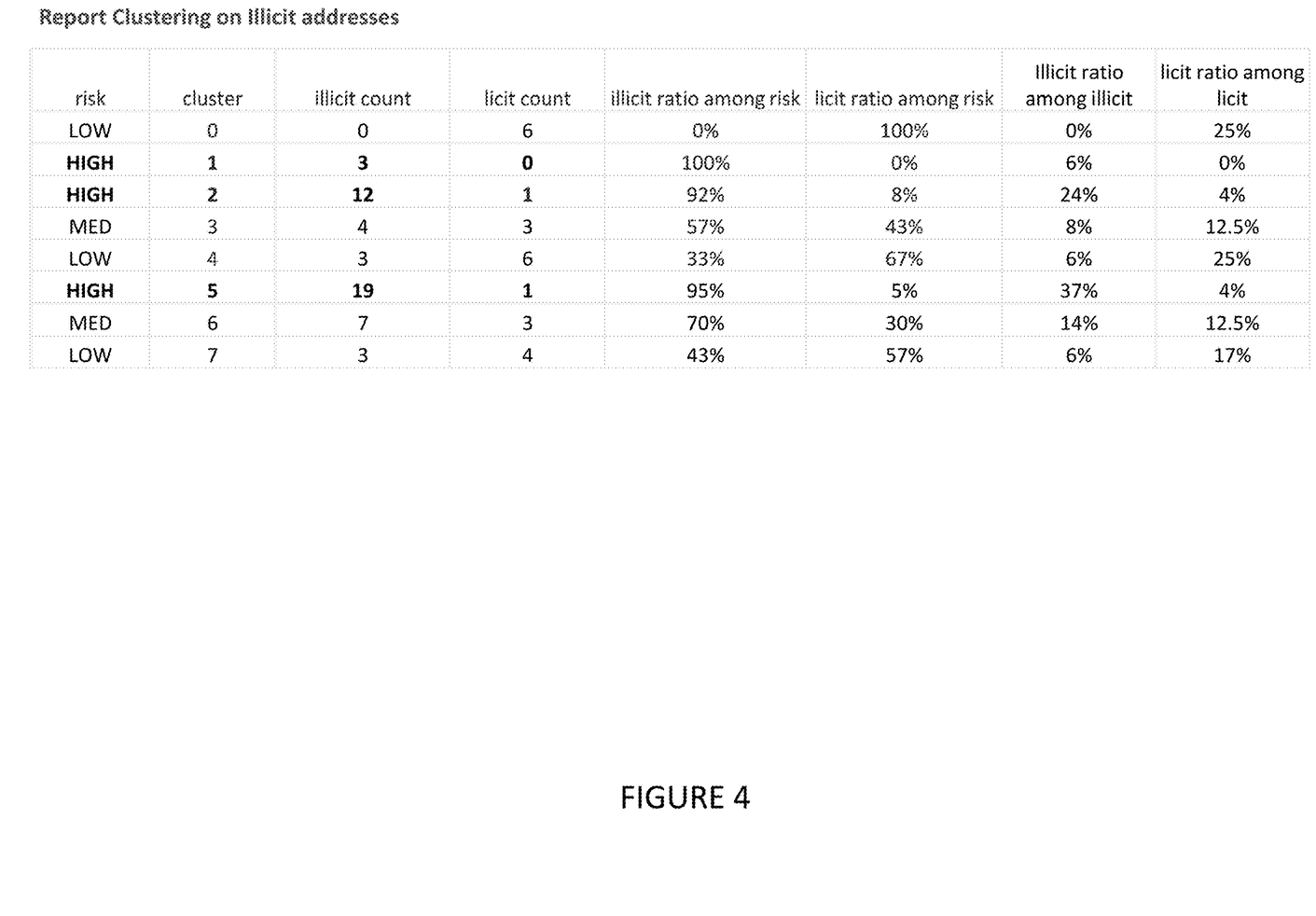
FIG. 4 depicts an example of cluster verification from labelled data for community reports/public reports (e.g., "bitcoinabuse" web platform) according to an embodiment.

FIG. 4 depicts an example of cluster verification from labelled data for public/community reports according to an embodiment.

Figure 5:
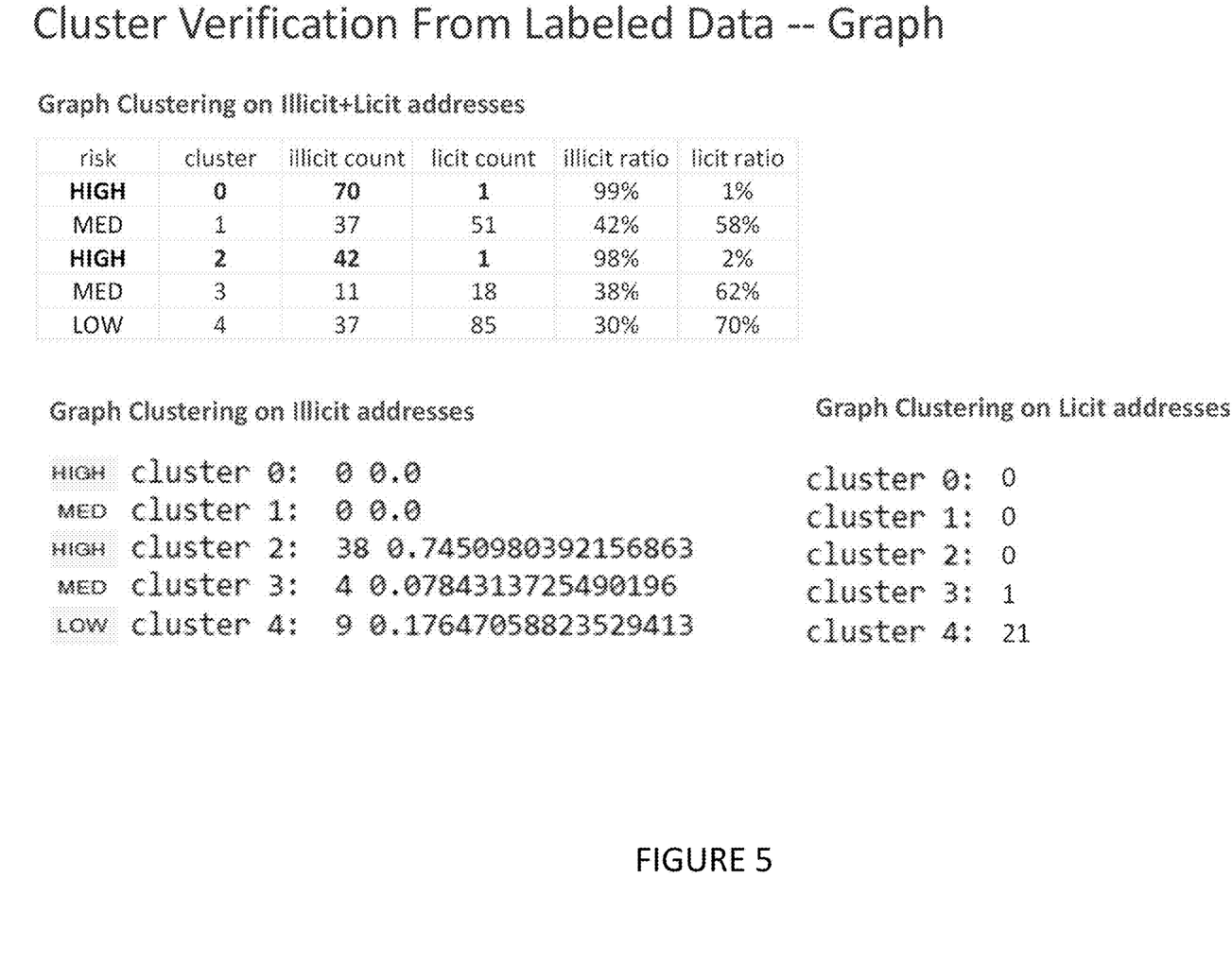
FIG. 5 depicts an example of cluster verification from labelled data for transaction graphs according to an embodiment.

FIG. 5 depicts an example of cluster verification from labelled data for transaction graphs according to an embodiment.

In one embodiment, the risk diagnosis computer program may be provided as part of a transaction process, wherein prior to the completion of the transaction, the risk diagnosis computer program may predict the risk associated with the transaction and may inform the user of the predicted risk. In one embodiment, the risk diagnosis computer program may require confirmation from the user prior to executing a transaction with a predicted risk level above a certain level. In another embodiment, the risk diagnosis computer program may prevent a transaction with a predicted risk level above a certain level from being executed.

Figure 6:
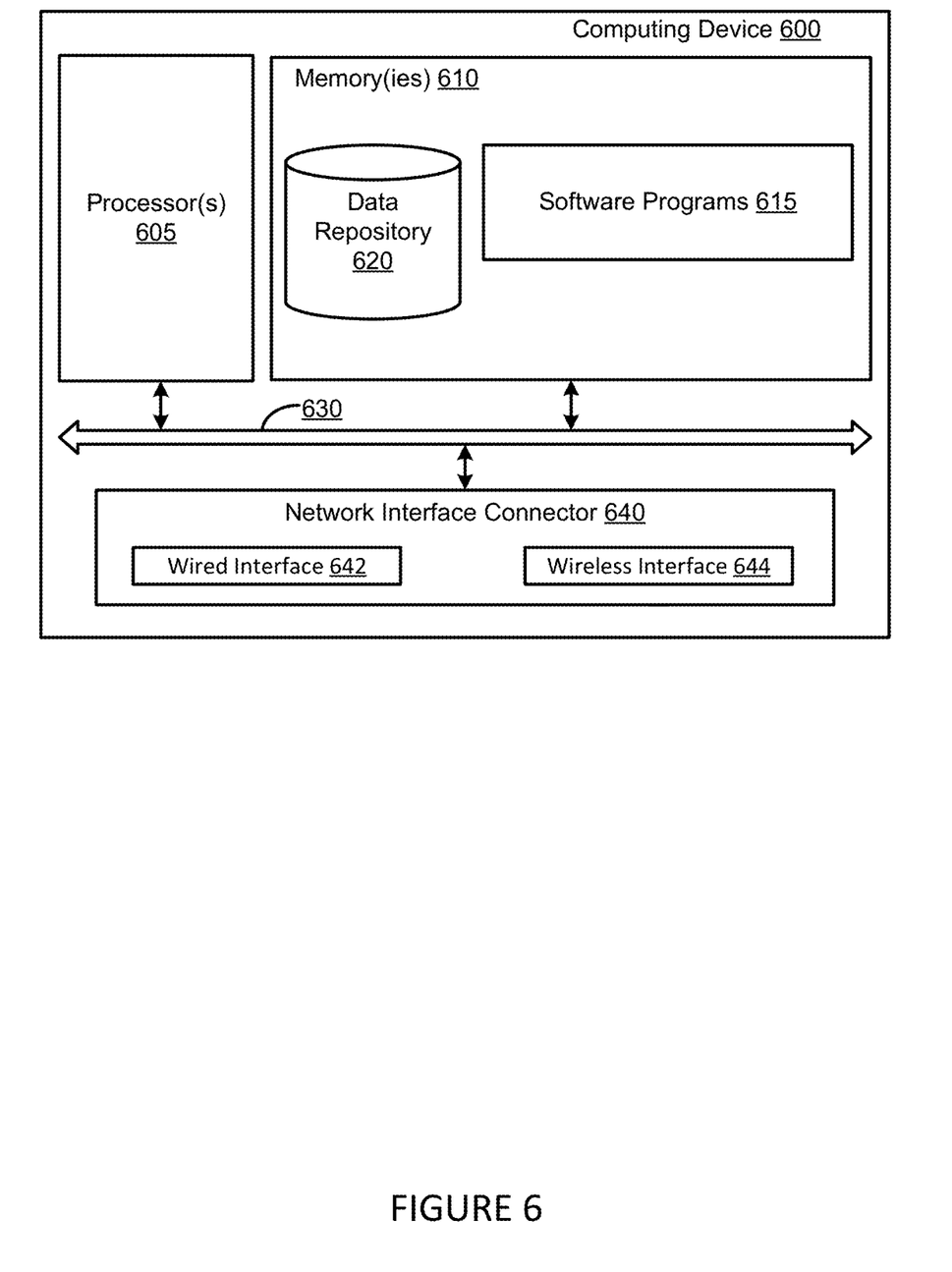
FIG. 6 depicts an exemplary computing system for implementing aspects of the present disclosure.

FIG. 6 depicts an exemplary computing system for implementing aspects of the present disclosure. FIG. 6 depicts exemplary computing device 600. Computing device 600 may represent the system components described herein. Computing device 600 may include processor 605 that may be coupled to memory 610. Memory 610 may include volatile memory. Processor 605 may execute computer-executable program code stored in memory 610, such as software programs 615. Software programs 615 may include one or more of the logical steps disclosed herein as a programmatic instruction, which may be executed by processor 605. Memory 610 may also include data repository 620, which may be nonvolatile memory for data persistence. Processor 605 and memory 610 may be coupled by bus 630. Bus 630 may also be coupled to one or more network interface connectors 640, such as wired network interface 642 or wireless network interface 644. Computing device 600 may also have user interface components, such as a screen for displaying graphical user interfaces and receiving input from the user, a mouse, a keyboard and/or other input/output components (not shown).

Additional details may be found in the attached Appendix, the disclosure of which is hereby incorporated, by reference, in its entirety.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for risk diagnosis of cryptocurrency addresses on blockchains, comprising:
   receiving, by a risk diagnosis computer program executed by a server, data with risk labels and data without risk labels from public data databases and/or anonymous data databases;
   fitting, by the risk diagnosis computer program, the data without risk labels and the data with risk labels into a plurality of clusters using unsupervised learning;
   assigning, by the risk diagnosis computer program, a risk level to each of the plurality of clusters based on the data with risk labels in the cluster;
   receiving, by the risk diagnosis computer program, unseen data;
   predicting, by the risk diagnosis computer program, a risk level associated with the unseen data by constructing features from the unseen data, clustering the unseen data to one of the plurality of clusters, and returning the risk level associated with the cluster to which the unseen data is clustered; and
   preventing, by the risk diagnosis computer program, a transaction involving the unseen data from occurring in response to the unseen data being associated with a high risk.

2. The method of claim 1, wherein the data comprises transaction graphs and public reports for blockchain addresses.

3. The method of claim 1, wherein the risk diagnosis computer program constructs feature vectors from features and/or text embeddings from the data without risk labels.

4. The method of claim 1, wherein the risk diagnosis computer program clusters the data without risk labels using an unsupervised learning/embedding algorithm.

5. The method of claim 4, wherein the unsupervised learning/embedding algorithm comprises K-means clustering or a graph neural network.

6. The method of claim 1, wherein the unseen data comprises a cryptocurrency address associated with a potential counterparty.

7. The method of claim 1, further comprising:
   notifying, by the risk diagnosis computer program, a user application that the unseen data is associated with a high risk.

8. The method of claim 1, wherein the data comprises blockchain address data.

9. A system, comprising:
   one or more databases storing data with risk labels and data without risk labels;
   a server executing a risk diagnosis computer program; and
   a user device executing a user application;
   wherein:
   the risk diagnosis computer program receives the data with risk labels and the data without risk labels, fits the data without risk labels and the data with risk labels into a plurality of clusters using unsupervised learning, assigns a risk level to each of the plurality of clusters based on the data with risk labels in the cluster, receives unseen data from the user application, and predicts a risk level associated with the unseen data by constructing features from the unseen data, clustering the unseen data to one of the plurality of clusters, returning the risk level associated with the cluster to which the unseen data is clustered, and preventing a transaction involving the unseen data from occurring in response to the unseen data being associated with a high risk.

10. The system of claim 9, wherein the data comprises transaction graphs and public reports for blockchain addresses.

11. The system of claim 9, wherein the risk diagnosis computer program constructs feature vectors from features and/or text embeddings from the data without risk labels.

12. The system of claim 9, wherein the risk diagnosis computer program clusters the data without risk labels using an unsupervised learning/embedding algorithm.

13. The system of claim 12, wherein the unsupervised learning/embedding algorithm comprises K-means clustering or a graph neural network.

14. The system of claim 9, wherein the unseen data comprises a cryptocurrency address associated with a potential counterparty.

15. The system of claim 9, wherein the risk diagnosis computer program notifies the user application that the unseen data is associated with a high risk.

16. The system of claim 9, wherein the data without risk labels comprises data with masked or hidden risk labels.

17. A non-transitory computer readable storage medium, including instructions stored thereon, which when read and executed by one or more computer processors, cause the one or more computer processors to perform steps comprising:
receiving data with risk labels and data without risk labels from public data databases and/or anonymous data databases, wherein the data comprises transaction graphs and public reports for blockchain addresses;
fitting the data without risk labels and the data with risk labels into a plurality of clusters using an unsupervised learning/embedding algorithm, wherein the unsupervised learning/embedding algorithm comprises K-means clustering or a graph neural network;
assigning a risk level to each of the plurality of clusters based on the data with risk labels in the cluster;
receiving unseen data, wherein the unseen data comprises a cryptocurrency address associated with a potential counterparty;
predicting a risk level associated with the unseen data by constructing features from the unseen data, clustering the unseen data to one of the plurality of clusters, and returning the risk level associated with the cluster to which the unseen data is clustered; and
preventing a transaction involving the unseen data from occurring in response to the unseen data being associated with a high risk.

* * * * *